H. Ogborn.
Cultivator.
No. 29,094.    Patented July 10, 1860.
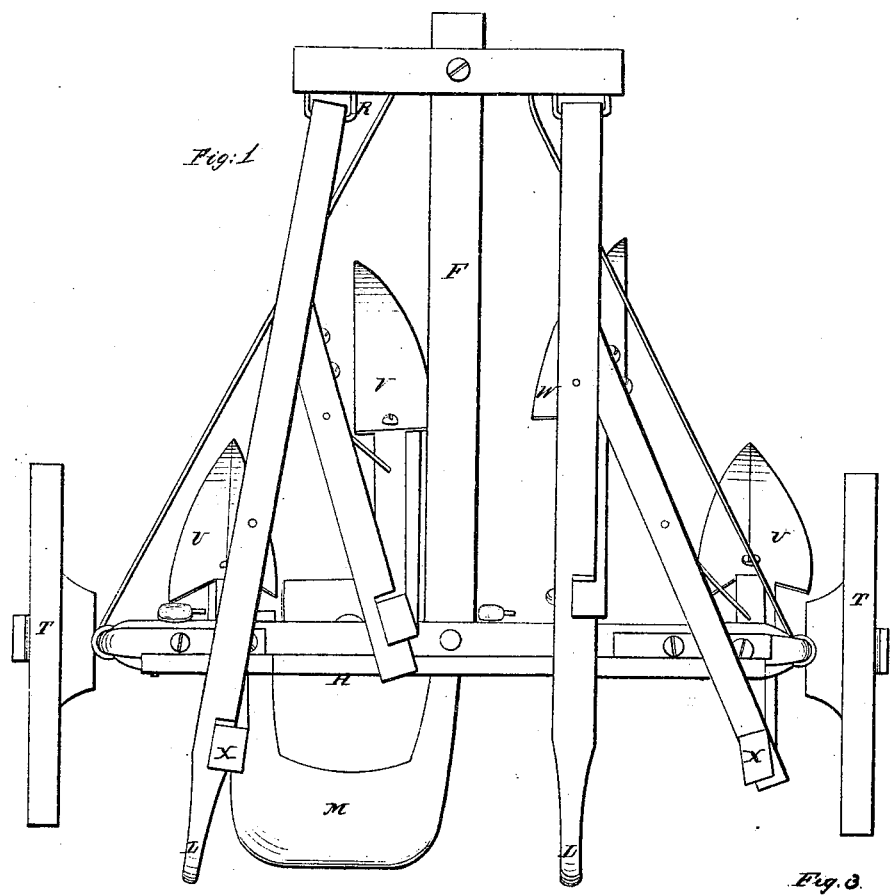
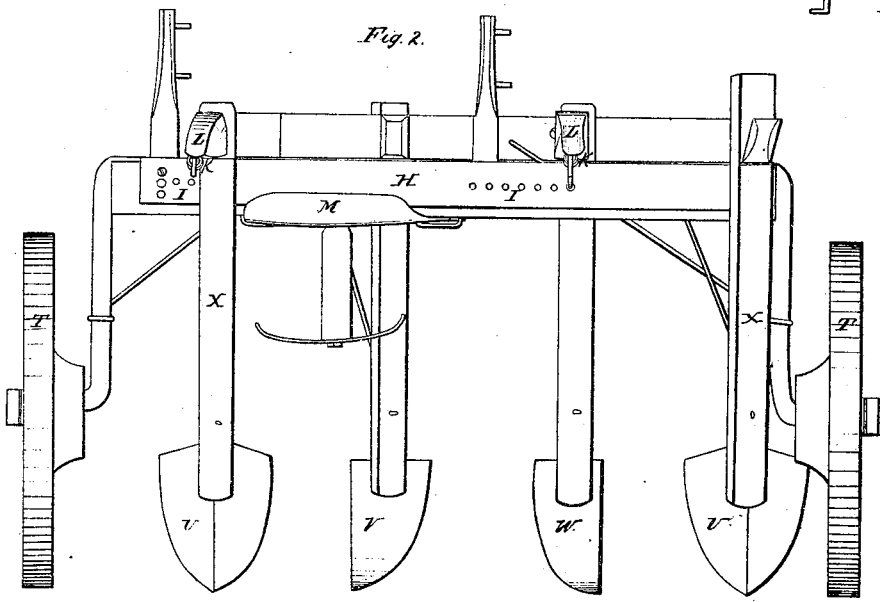

UNITED STATES PATENT OFFICE.

HARRISON OGBORN, OF GREENFORK, INDIANA.

IMPROVEMENT IN CULTIVATORS.

Specification forming part of Letters Patent No. 29,094, dated July 10, 1860.

*To all whom it may concern:*

Be it known that I, HARRISON OGBORN, of Greenfork, in the county of Wayne and State of Indiana, have invented a new and useful Machine for Plowing or Cultivating Corn or Cotton and all kinds of Hill Crops; and I do hereby declare that the following is a full, clear, and exact description of the construction and operation of the same, reference being had to the annexed drawings, making a part of this specification, in which—

Figure 1 is a plan or top view of the machine. Fig. 2 is a rear elevation.

I construct my machine with four plows, as shown at U U V W in Figs. 1 and 2, which plows are attached to beams A B C D by means of sheths or foot-pieces X X. These beams are attached to the cross-piece E in front, which sustains the weight of the beams and plows, and are connected to it by staples.

S, Fig. 2, are the brace-rods.

Y Y are posts to support the weight of the plows and beams when thrown up out of the ground, on which posts are pins Z Z or notches to hold the beams when thrown up.

L are the handles to the machine.

K are the spring-bolts that hold the plow-beams in place, which bolts fit in the holes I I in the piece H, which piece is also provided with set-screws or any other convenient device to be used to regulate the depth of the plows by raising or lowering the plow-beams as the beams rest on the piece H.

T T are small wheels, on which the machine is mounted.

G G is a crooked axle-tree, which allows it to pass over obstructions.

F is the tongue to the machine.

E is the piece to which the beams are attached.

M is a movable seat for the driver.

In the foregoing like letters refer to similar parts in the different figures or drawings.

I usually construct my machines with a tongue for two horses; but if it is desired to use but one horse, then thills must be substituted for the tongue and placed far enough to one side to allow the horse to walk to one side of the row.

Having described the construction of my machine, I will proceed to describe its operation.

When two horses are attached to it the row is between them. When but one, the horse walks between the row that is being plowed and the one next to it. The driver either sits on the seat or removes it and walks, for the handles and beams are so arranged as to allow him to walk to one side of the row of what he is plowing. The center of the machine is directly over the row that is being plowed. The middle shovel is made straight on one side, so that when the plants are small the straight part of the shovel may go next to the plants or row and throw most of the dirt from the corn or plants of any kind. When, as the outside shovels run a little behind, they will throw the dirt or mellow earth back and leave the ground in good condition; but when the plants are large and it is desired to hill them up, the shovels on the inside may be reversed, so that they will throw the loose earth up around the plants or hills.

When it is desired to throw the plows either up out of the ground or to one side or the other the person plowing throws either one or more of his fingers over the projecting end of the spring-bolts and draws them back, thereby releasing the beams and allowing them to be moved easily either sidewise or vertically.

When it is desired to leave the plows up in going to or from the field the plowman draws the bolts and throws the beams upon the pins in the standard, where they will remain until taken down.

It is designed to finish a row of whatever is being plowed in a complete manner every time the machine crosses the field.

Having thus described the nature, construction, and operation of my invention, what I claim therein as new and useful, and desire to secure by Letters Patent, is—

The arrangement of the spring-bolts K K, the piece H, staple R, and movable seat M, in combination with the plows U U and V W, the whole being arranged, constructed, and operated substantially as above set forth.

HARRISON OGBORN.

Witnesses:
JONATHAN ELLIOTT,
L. D. PEISONETT.